(12) United States Patent
Wu et al.

(10) Patent No.: US 9,693,615 B2
(45) Date of Patent: Jul. 4, 2017

(54) VARIABLE-COLOR ACCESSORY AND VARIABLE-COLOR DEVICE APPLIED THERETO

(71) Applicant: BLACKDIAMOND INNOVATION GROUP, Poughkeepsie, NY (US)

(72) Inventors: Jia-Hung Wu, Poughkeepsie, NY (US); Chun-Yung Sung, Poughkeepsie, NY (US)

(73) Assignee: BLACKDIAMOND INNOVATION GROUP, Poughkeepsie, NY (US)

(*) Notice: Subject to any disclaimer, the term of this patent is extended or adjusted under 35 U.S.C. 154(b) by 155 days.

(21) Appl. No.: 14/860,260

(22) Filed: Sep. 21, 2015

(65) Prior Publication Data

US 2016/0091195 A1 Mar. 31, 2016

Related U.S. Application Data

(60) Provisional application No. 62/055,626, filed on Sep. 25, 2014.

(30) Foreign Application Priority Data

Mar. 6, 2015 (TW) .............................. 104203370 U (51) Int. Cl.
*F21V 7/04* (2006.01)
*A45C 15/06* (2006.01)
*F21V 8/00* (2006.01)

(52) U.S. Cl.
CPC ............ *A45C 15/06* (2013.01); *G02B 6/0051* (2013.01)

(58) Field of Classification Search
CPC .... A45C 15/06; G02B 6/0051; G02B 6/0053; G02B 6/0063; G02B 6/0066; A61K 2035/11; A61Q 19/00
See application file for complete search history.

(56) References Cited

U.S. PATENT DOCUMENTS

| | | | | | |
|---|---|---|---|---|---|
| 4,480,293 | A | * | 10/1984 | Wells | .................. A41D 27/085 362/103 |
| 4,727,603 | A | * | 3/1988 | Howard | ............... A41D 27/085 2/115 |
| 5,649,755 | A | * | 7/1997 | Rapisarda | ............ A43B 1/0036 362/103 |
| 8,147,086 | B2 | * | 4/2012 | Tait | ........................ A45C 15/06 362/156 |
| 2010/0226117 | A1 | * | 9/2010 | Krans | ..................... G09F 13/00 362/97.1 |
| 2017/0045775 | A1 | * | 2/2017 | Zhong | .................. G02F 1/1335 |

* cited by examiner

*Primary Examiner* — Ali Alavi
(74) *Attorney, Agent, or Firm* — Li & Cai Intellectual Property (USA) Office (57) ABSTRACT

A variable-color accessory is provided comprising: a plurality of accessory surfaces, a light-emitting plate, a light-scattering plate, and a control unit. The light-emitting plate is mounted inside one of the accessory surfaces, where the light-emitting plate is flexible, is bent consistently with one of the accessory surfaces, and has a plurality of light-emitting diodes for emitting different light colors. The light-scattering plate is disposed between the light-emitting plate and one of the accessory surfaces, where the light-scattering plate is flexible and transmits light. The control unit is electrically connected to the light-emitting plate, to control turn-on/off of the light-emitting diodes of the light-emitting plate. A variable-color device applied to the accessory is further provided.

20 Claims, 6 Drawing Sheets

VARIABLE-COLOR ACCESSORY AND VARIABLE-COLOR DEVICE APPLIED THERETO

TECHNICAL FIELD

The present invention relates to a variable-color accessory and a variable-color device applied thereto, and in particular, a variable-color accessory using a flexible light-emitting plate to control the color and to have uniform brightness on the exterior and a variable-color device applied to the accessory.

BACKGROUND ART

Accessories such as handbags are usually carried by users. In order to match the color of a user's outfit, the user usually needs to buy handbags with various colors or styles, which tends to place a financial burden on the user.

In addition, the use of handbags as fashion accessories is not only for holding things but also as a part of the outfit. In order to match clothes of different colors and styles, and adapt to different occasions, a user usually needs to own multiple handbags with different colors and styles. Each time the user changes his/her handbag, the user must move articles from one handbag to another one, which causes inconvenience for the user. Buying and storing multiple handbags also places a heavy burden on the user. In order to solve the problem, a handbag is disclosed in U.S. Patent Publication No. US 20080087360 A1, where the exterior color of the handbag can be changed by replacing the surface cloth of the handbag. However, the multiple cloth surfaces are still physical objects, there are still concerns over stockpiling and costs, and it is also very inconvenient to replace the cloth surfaces. Thus, if a surface color of a handbag could be modified through changing the color of a light source, these problems in handling multiple pieces of physical cloth could be solved.

A handbag disclosed in U.S. Patent Publication No. U.S. 6,431,724 B1 is an example of a handbag with lamp decorations, where an exterior of the handbag can be changed through lamplight, but only one light-emitting unit is disposed on one surface of the handbag to emit only one light color. In addition, light emitted from the light-emitting unit of the handbag is unevenly distributed on the corresponding handbag surface, so that obvious light and shade areas are present on the exterior of the handbag.

SUMMARY OF THE INVENTION

The technical problem to be solved by the present invention is to provide a variable-color accessory with evenly distributed brightness, without obvious light and shade areas and a variable-color device applied thereto.

In order to solve the technical problem above, the present invention provides a variable-color accessory and a variable-color device applied to the accessory, wherein a plurality of light sources for emitting different light colors are controlled to change an exterior color and a light-scattering plate is used to evenly disperse the light from the light sources. More specifically, an embodiment of the present invention provides a variable-color accessory, comprising: a plurality of accessory surfaces, a light-emitting plate, a light-scattering plate, and a control unit. The plurality of surfaces of the accessory are flexible. The light-emitting plate is mounted inside of one of the accessory surfaces. The light-emitting plate is flexible and is bent consistent with accessory surfaces. The light-emitting plate has a plurality of light-emitting diodes for emitting different light colors. The light-scattering plate is disposed between the light-emitting plate and one of the accessory surfaces, where the light-scattering plate is flexible and light-transmitting. The control unit is electrically connected to the light-emitting plate to control on/off and illumination intensity of the light-emitting diodes of the light-emitting plate.

Another embodiment of the present invention provides a variable-color device applied to an accessory. The variable-color device is mounted inside one surface among the surfaces of an accessory and comprises a light-emitting plate, a light-scattering plate, and a control unit. The light-emitting plate is flexible and has a plurality of light-emitting diodes for emitting different light colors. The light-scattering plate is flexible and light-transmitting, wherein one surface of the light-scattering plate is bonded with the light-emitting plate and can be bent consistently with the light-emitting plate. The control unit is electrically connected to the light-emitting plate to control on/off and illumination intensity of the light-emitting diodes of the light-emitting plate.

Through the variable-color accessory and the variable-color device applied to the accessory provided in the embodiments of the present invention, the beneficial effects of the present invention are that the user can adjust the overall color and brightness of the accessory surfaces displayed outside the light-emitting diodes by controlling on/off and illumination intensity of the plurality of different colors of light-emitting diodes. In addition, through the use of the light-scattering plate, concentrated light (light emitted from a single light-emitting diode) with high brightness can be evenly emitted and dispersed to a larger area. In this way, when the light emitted from the light-emitting diodes passes through the light-scattering plate to illuminate the corresponding accessory surface, a surface of evenly distributed brightness and color is presented on the outside of the corresponding accessory surface, without obvious light and shade areas being observed.

In order to further understand the features and technical content of the present invention, reference is made to the following detailed description and accompanying drawings related to the present invention. However, the description and accompanying drawings are only intended for illustration, but do not limit the claims of the present invention in any way.

DETAILED DESCRIPTION OF THE PREFERRED EMBODIMENTS

The implementation of a variable-color accessory and a variable-color device applied to an accessory disclosed in the present invention is illustrated with the following specific examples, and a person skilled in the art can readily appreciate the advantages and effectiveness of the present invention according to the disclosed contents in this specification. The present invention may be executed or applied with other different embodiments, and any details in the specification may be modified or varied based on different points of view and applications without departing from the spirit of the present invention. Also, herein, the drawings of the present invention are only intended for illustration and are not drawn to scale, that is, actual dimensions of relevant components are not reflected. The following embodiments are used to further describe the relevant technical content of the present invention in detail, but are not intended to limit the technical scope of the present invention.

First Embodiment

Figure 1:
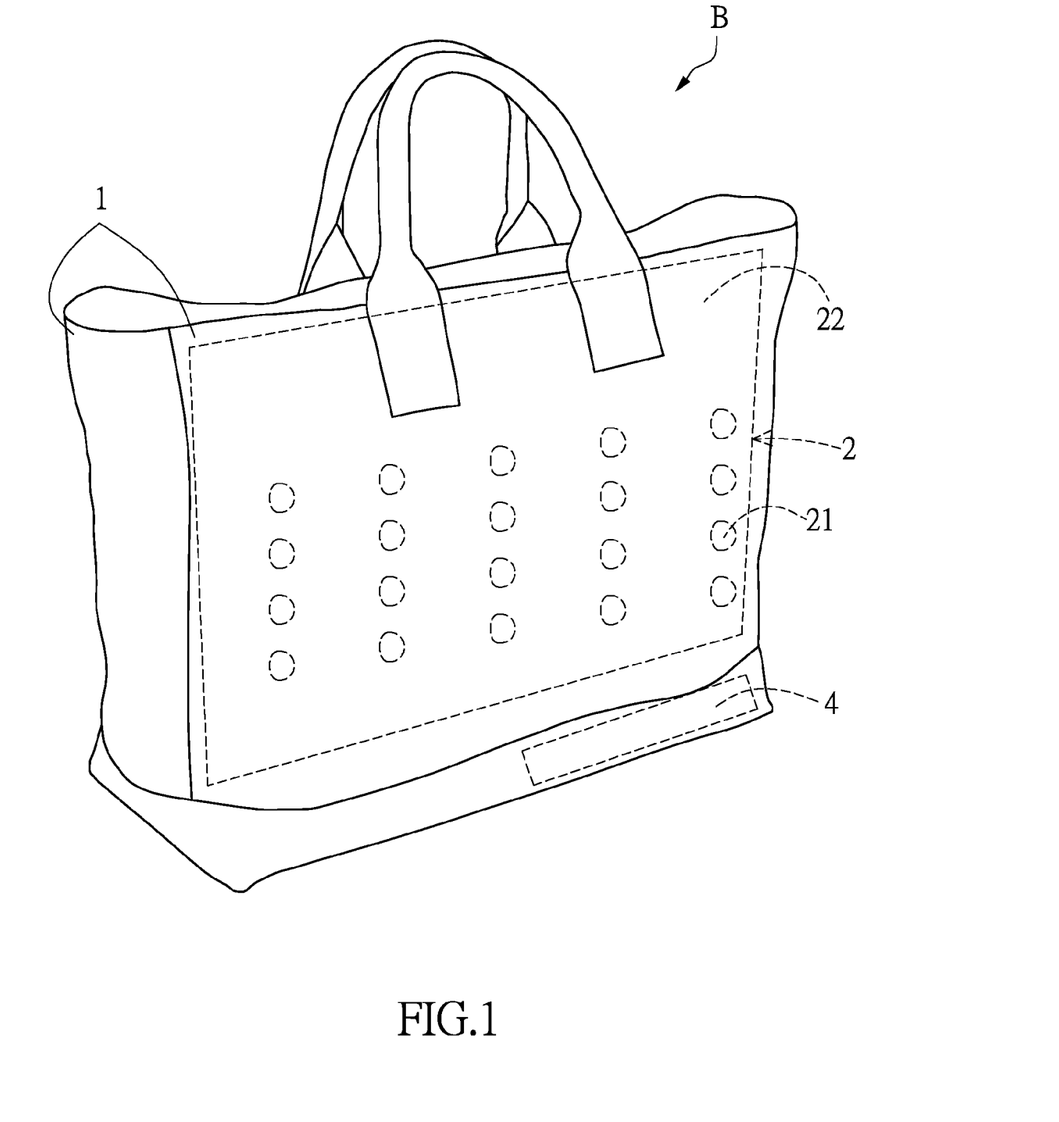
FIG. 1 is a schematic view according to a first embodiment of the present invention.
Figure 2:
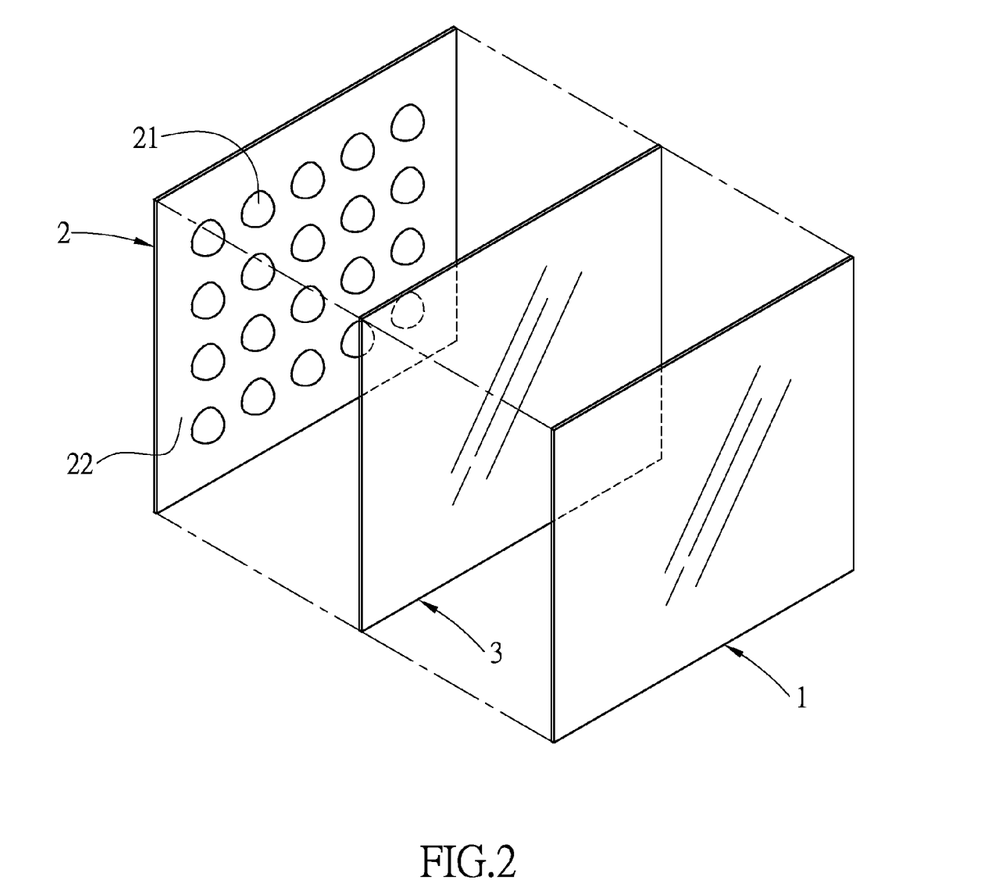
FIG. 2 is a schematic exploded view of a light-emitting plate, a light-scattering plate, and a handbag surface according to an embodiment of the present invention.

Referring to FIG. 1, in this embodiment, a variable-color accessory B is a handbag and the accessory surfaces 1 are a plurality of handbag surfaces of the handbag. Referring to FIG. 1 and FIG. 2, the accessory B in this embodiment comprises a plurality of accessory surfaces 1, a light-emitting plate 2, a light-scattering plate 3, and a control unit 4 for controlling the light-emitting plate 2. It should be noted that, in other implementations, the accessory B may comprise other accessories.

For example, the plurality of accessory surfaces 1 are flexible. The light-emitting plate 2 may also be flexible, and the light-emitting plate 2 is disposed inside one of the plurality of accessory surfaces 1. The light-emitting plate 2 can be bent consistent with one of the accessory surfaces 1. In this embodiment, an accessory surface 1 (corresponding handbag surface 1 hereinafter) which corresponds to the light-emitting plate 2, is a surface on the side of the handbag and is made of a transparent material.

The light-emitting plate 2 has a plurality of light-emitting diodes (LEDs) 21, for example, red, green, and blue light-emitting diodes 21, for emitting different light colors. Light emitted from the light-emitting diodes 21 may illuminate the corresponding handbag surface 1. The color and brightness of the corresponding handbag surface 1 can be controlled by controlling on/off and illumination intensity of different colors of light-emitting diodes 21. In this embodiment, the light-emitting plate 2 includes a flexible circuit board 22 and the light-emitting diodes 21 are disposed in a matrix on the circuit board 22.

The control unit 4 may be electrically connected to the light-emitting plate 2 to control on/off and illumination intensity of the light-emitting diodes 21 disposed on the light-emitting plate 2. The mechanism for controlling on/off and illumination intensity of the light-emitting diodes 21 is well-known in the art, and thus will not be described and is not particularly limited in this specification.

Referring to FIG. 2, the light-scattering plate 3 may be disposed between the light-emitting plate 2 and one of the accessory surfaces 1. Specifically, the light-scattering plate 3 is disposed between the light-emitting plate 2 and the corresponding handbag surface 1. The light-scattering plate 3 is flexible and light-transmitting. In this embodiment, the light-scattering plate 3 is made of expanded polyethylene (EPE) or Polyethylene foam (PE foam). Expanded polyethylene and Polyethylene foam (PE foam) are flexible, elastic and are suitable for being disposed and sandwiched between the bendable light-emitting plate 2 and the corresponding handbag surface 1. In addition, expanded polyethylene and polyethylene foam are light-transmitting material and enable concentrated light (light emitted from a single light-emitting diode) with high brightness to be evenly emitted and dispersed to a larger area. In this way, when the light emitted from the light-emitting diodes 21 passes through the light-scattering plate 3 to illuminate the corresponding handbag surface 1, a surface of uniform brightness and color is presented on the outside of the corresponding handbag surface 1 without obvious light and shade areas being observed. Moreover, both expanded polyethylene and polyethylene foam are less expensive, thereby the manufacturing cost of this embodiment is reduced.

In this embodiment, one surface of the light-scattering plate 3 is bonded with the light-emitting plate 2, and the other surface of the light-scattering plate 3 is bonded with the corresponding handbag surface 1. With this structure, when the corresponding handbag surface 1 is bent, the light-scattering plate 3 and the light-emitting plate 2 can be bent consistent with the corresponding handbag surface 1, such that the corresponding handbag surface 1 can be evenly and effectively illuminated with the light emitted from the light-emitting diodes 21 on the light-emitting plate 2. It should be noted that, in this embodiment, a handbag surface 1' corresponding to a light-emitting plate 2' may be any exterior surface of the handbag.

Second Embodiment

Figure 3:
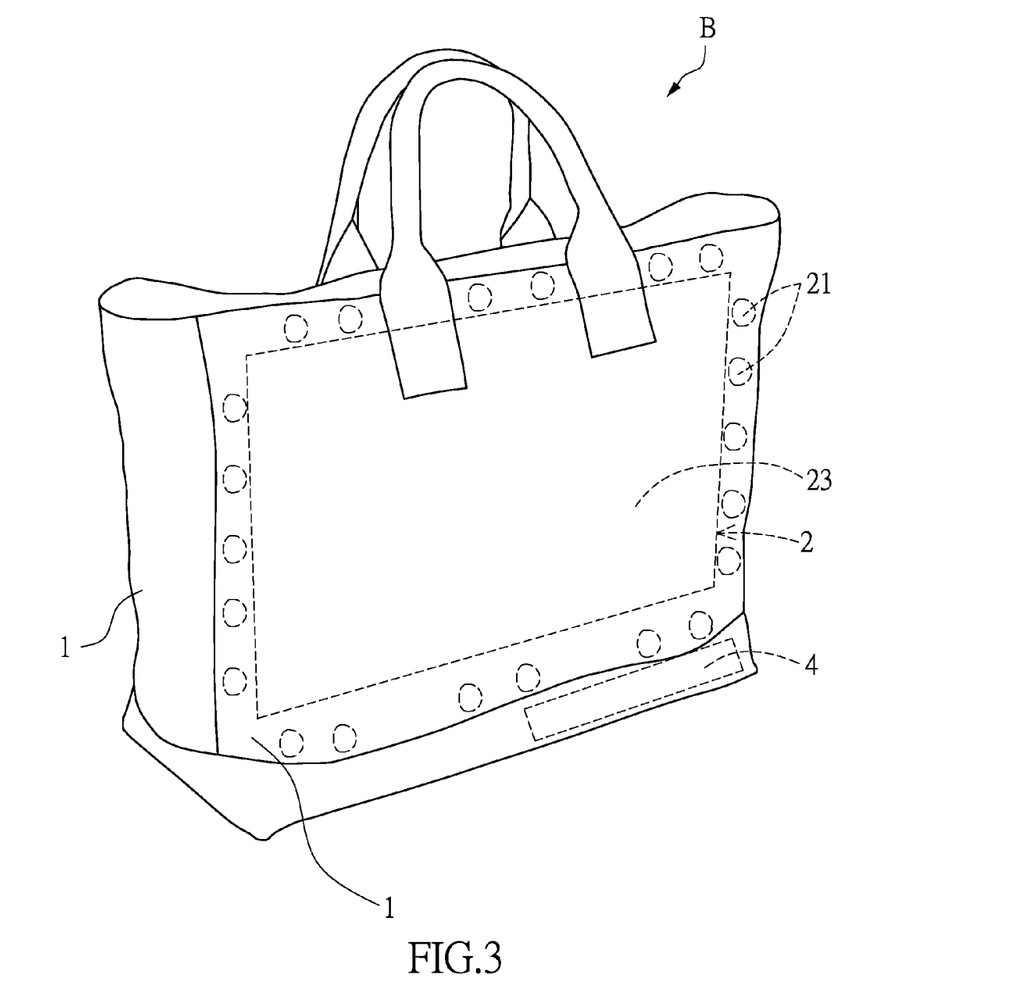
FIG. 3 is a schematic view according to a second embodiment of the present invention.

This embodiment is generally the same as the first embodiment, except that the light-emitting plate 2 is of a different structure. Referring to FIG. 3, in this embodiment, the light-emitting plate 2 is an edge lighting structure. The edge lighting structure has a light guide plate 23, and the light-emitting diodes 21 are disposed on at least one edge of the light guide plate 23. The light emitted from the light-emitting diodes 21 is first incident on the light guide plate 23, and then is guided by the light guide plate 23 onto the light-scattering plate 3. The light emitted from the light-emitting plate 2 in this embodiment becomes more even after being adjusted by the light guide plate 23. It should be noted that, the light guide plate 23 may be a light guide film.

Third Embodiment

This embodiment is generally the same as the first embodiment, except that the light-scattering plate 3 is made of expanded polypropylene (EPP). Expanded polypropylene has flexible and elastic properties and is suitable for being disposed and sandwiched between the bendable light-emitting plate 1 and the corresponding handbag surface 1. In addition, expanded polypropylene is a light-transmitting material and enables concentrated light (light emitted from a single light-emitting diode) with high brightness to be emitted out and evenly dispersed to a larger area. In this way, when the light emitted from the light-emitting diodes 21 passes through the light-scattering plate 3 to illuminate the corresponding handbag surface 1, a surface of even brightness and color is presented outside the corresponding handbag surface 1 without obvious light and shade areas being observed. Moreover, expanded polypropylene is less expensive, thereby reducing the manufacturing cost of this embodiment.

Fourth Embodiment

This embodiment is generally the same as the first embodiment, except that the light-scattering plate 3 is made of an ethylene-vinyl acetate copolymer (EVA). The ethylene-vinyl acetate copolymer has flexible and elastic properties and is suitable for being sandwiched between the bendable light-emitting plate 1 and the corresponding handbag surface 1. In addition, the ethylene-vinyl acetate copolymer is a light-transmitting material and enables concentrated light (light emitted from a single light-emitting diode) with high brightness to be emitted and evenly dispersed to a larger area. In this way, when the light emitted from the light-emitting diodes 21 passes through the light-scattering plate 3 to illuminate the corresponding handbag surface 1, a surface of even brightness and even color is presented outside the corresponding handbag surface 1 without obvious light and shade areas being observed. Moreover, the ethylene-vinyl acetate copolymer is less expensive, thereby the manufacturing cost of this embodiment is reduced.

Fifth Embodiment

Figure 4:
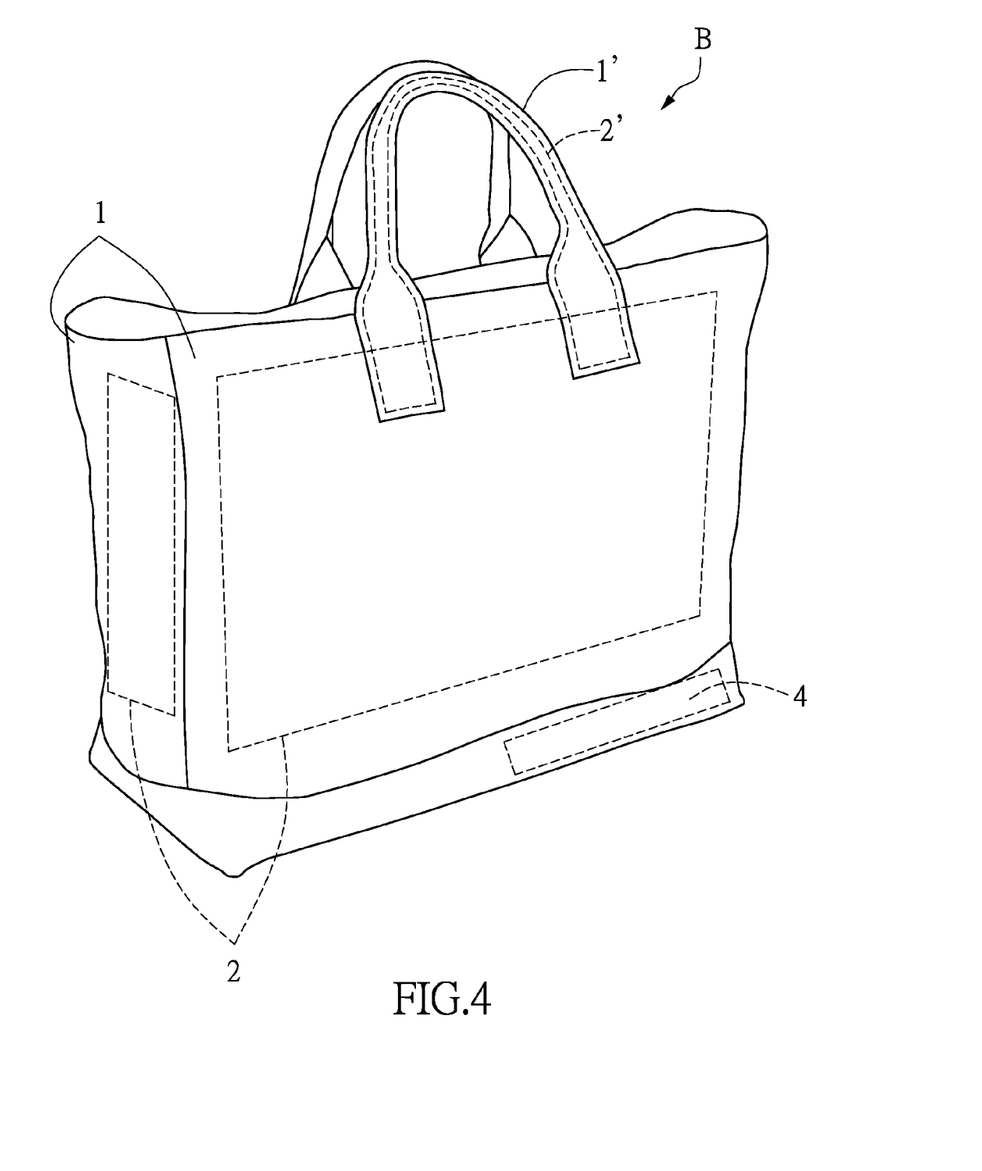
FIG. 4 is a schematic view according to a fifth embodiment of the present invention.

Referring to FIG. 4, this embodiment is generally the same as the first embodiment, except that this embodiment comprises a plurality of light-emitting plates 2, the light-emitting plates being disposed inside of a plurality of corresponding handbag surfaces 1 of the handbag, respectively. In this way, the light-emitting plates 2 can control color and brightness of the plurality of corresponding handbag surfaces 1 respectively. It should be noted that, in this embodiment, a handbag surface 1' corresponding to a light-emitting plate 2' may be a shoulder strip or any exterior surface of the handbag.

Sixth Embodiment

Figure 5:
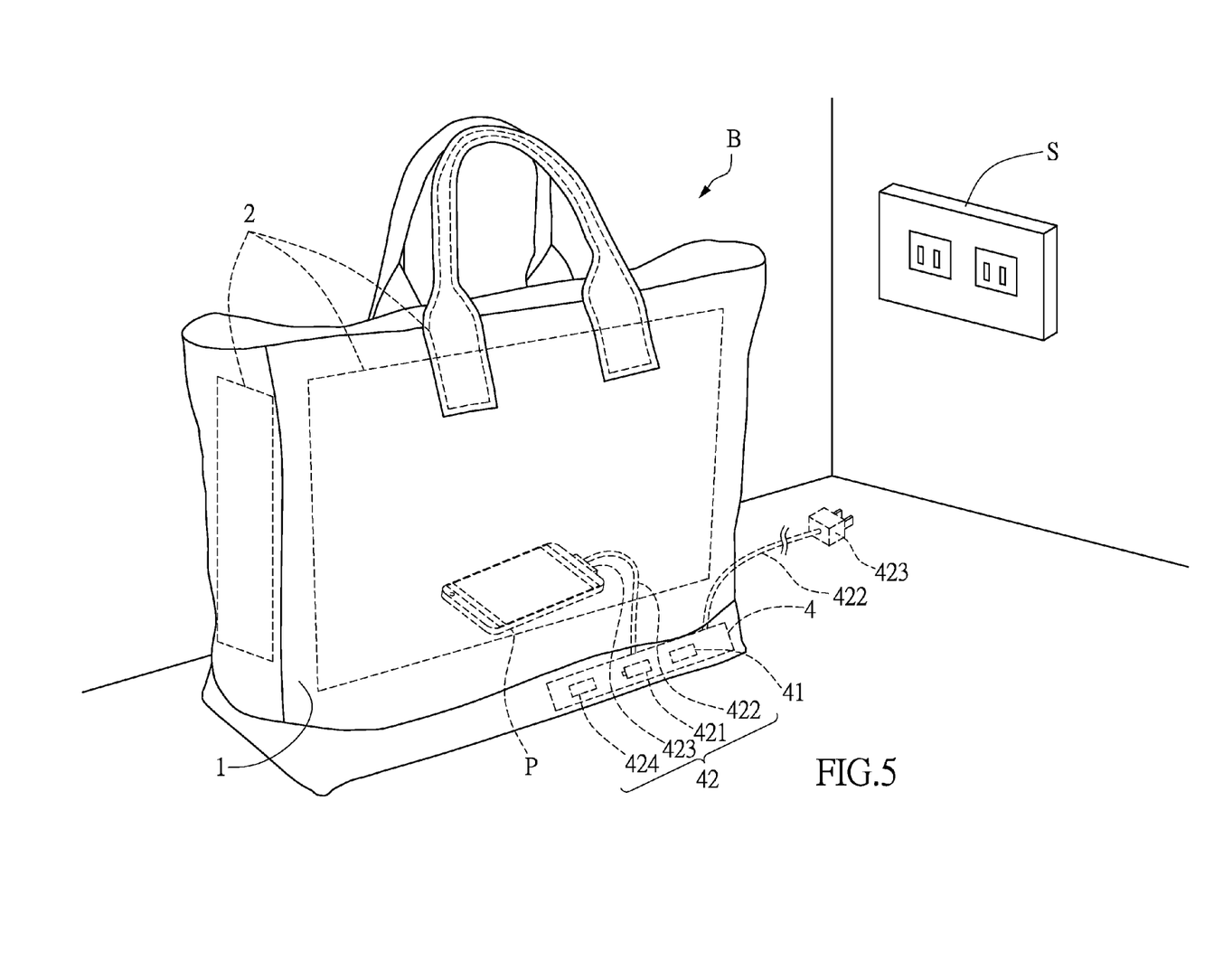
FIG. 5 is a schematic view according to a sixth embodiment of the present invention.

Referring to FIG. 5, this embodiment is generally the same as the first embodiment. In this embodiment, the control unit 4 for controlling the light-emitting plate has a wireless transceiver 41 and a power supply unit 42.

The wireless transceiver 41 can receive a wireless signal, for example, a wireless signal transmitted from a mobile phone. In this way, a user can use a mobile phone to control the control unit 4 for controlling the light-emitting plate 2 and further control the color and brightness of the handbag. In addition, to manually select the color and brightness, the user can also use a camera function of the mobile phone to take a photo of his/her clothing, and then select the color from any item of the photo, a mobile software will calculate the best matching color or identify the same color for that item. The color signals will be transmitted to the control unit 4 to further control the color and brightness of the handbag. The user can use the camera function of the mobile phone to take the real-time imaging and select the color from the real-time image. The color signal will be transmitted to the control unit 4 to further control the color and brightness of the handbag. It should be noted that, a plurality of arrays comprising red, green, and blue light-emitting diodes may be disposed on the light-emitting plate 3. In this way, the user can control the control unit 4 through the mobile phone to generate any color by mixing the intensity of the red, green and blue light emitted from the light-emitting diodes.

The power supply unit 42 includes a battery 421, two wires 422, and two connectors 423 respectively disposed at ends of the two wires 422. In this embodiment, one of the connectors 423 may be a Universal Serial Bus (USB) connector for being electrically connected to an electronic device P (for example, a mobile phone). The other connector 423 may be a plug for being electrically connected to a power supply S.

The battery 421 can power the light-emitting diodes 21 of the light-emitting plate 2. In addition, when the connector 423 of one of the wires 422 is connected to an electronic device P, the battery 421 can also power the electronic device P. When the connector 423 of the other wire 422 is connected to a power supply S, the power supply S can charge the battery 421.

The power supply unit 42 in this embodiment may further include an induction coil 424. With the induction coil 424, the power supply unit 42 can wirelessly power an electronic device P or wirelessly charge the battery 421.

Seventh Embodiment

This embodiment is generally the same as the first embodiment, except that the corresponding handbag surface 1 is made of a light-transmitting material, which is not completely transparent and has an effect of light dispersing and fading.

Eighth Embodiment

Figure 6:
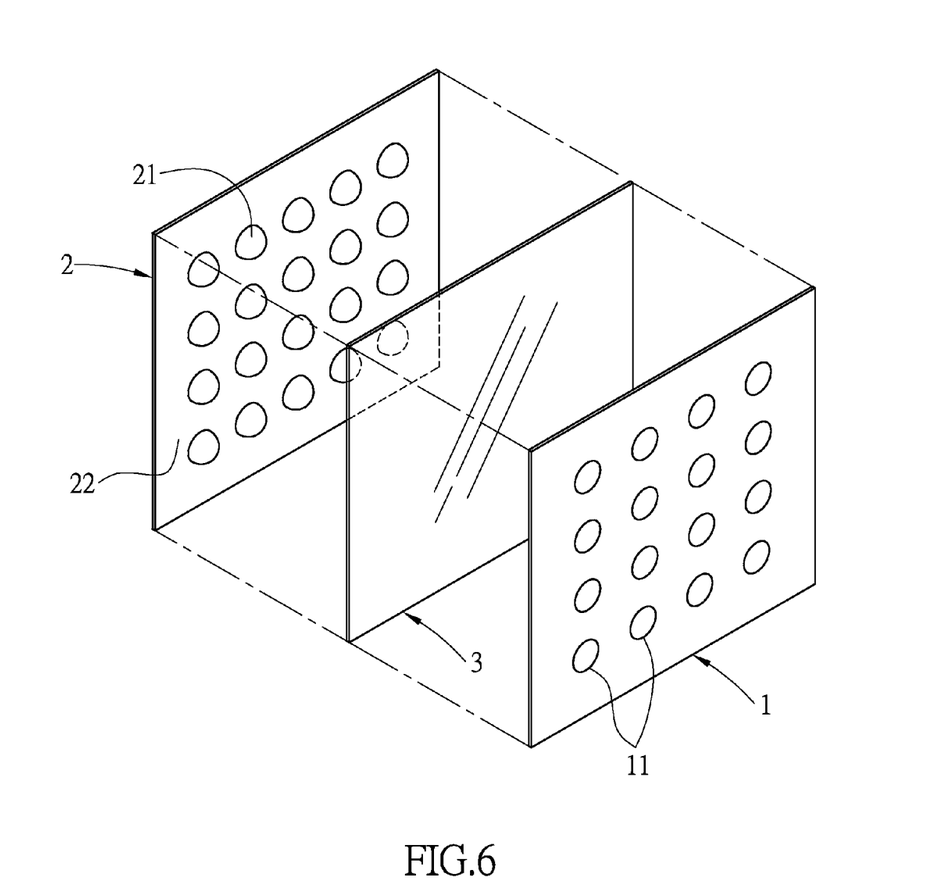
FIG. 6 is an exploded view of a light-emitting plate, a light-scattering plate, and a handbag surface according to an eighth embodiment of the present invention.

Referring to FIG. 6, this embodiment is generally the same as the first embodiment, except that the corresponding handbag surface 1 is made of an opaque material such as leather. A plurality of light transmission holes 11 may be provided on the corresponding handbag surface 1. Light emitted from the light-emitting plate 2 illuminates the exterior of the handbag through the light transmission holes 11.

Ninth Embodiment

This embodiment provides a variable-color device applied to an accessory. The variable-color device is disposed inside one of the accessory surfaces 1 of an accessory B and comprises a light-emitting plate 2, a light-scattering plate 3, and a control unit 4. In other words, the variable-color device provided in this embodiment may comprise the light-emitting plate 2, the light-scattering plate 3, and the control unit 4 described in the first embodiment to the eighth embodiment. For example, the light-emitting plate 2 may be flexible and have a plurality of light-emitting diodes 21 for emitting different light colors. The light-emitting diodes 21 may comprise red, green, and blue light-emitting diodes in an array. The light-scattering plate 3 is flexible and light-transmitting. One surface of the light-scattering plate 3 is bonded with the light-emitting plate 2 and can be bent consistent with the light-emitting plate. In addition, the control unit 4 may be electrically connected to the light-emitting plate 2 to control on/off and illumination intensity of the light-emitting diodes 21 disposed on the light-emitting plate 2. It should be noted that, the control unit 4 may include a wireless receiver 41 for receiving a wireless signal. In addition, as described in the above embodiments, the light-scattering plate 3 may be made of expanded polyethylene, polyethylene foam, expanded polypropylene, or an ethylene-vinyl acetate copolymer. It should be noted that, although the handbag is taken as an example of the accessory B in the above embodiments, the present invention is not limited thereto. For example, the accessory B may also be clothes or a cap worn by the user, and the accessory surface 1 may then be a surface material of the clothes or cap. In other words, the variable-color device provided in the ninth embodiment can be applied to the accessory B, that is, the variable-color device can be applied to clothes, caps and shoes.

Possible Effects of the Embodiments

With the variable-color accessory and the variable-color device applied to an accessory provided in the embodiments of the present invention, the user can adjust the overall color and brightness of the accessory surfaces disposed outside the light-emitting diodes by controlling turn-on/off of the plurality of light-emitting diodes of different light colors. In addition, through the light-scattering plate, concentrated light (light emitted from a single light-emitting diode) with high brightness can be evenly emitted and dispersed to a larger area. In this way, when the light emitted from the light-emitting diodes passes through the light-scattering plate to illuminate the corresponding accessory surface, a surface of even brightness and color is presented at the outside of the corresponding accessory surface, without obvious light and shade areas being observed.

The description above includes only preferred embodiments of the present invention and is not intended to limit the scope of the present invention. All equivalent technical changes made from the specification and drawings of the present invention should fall within the scope of the present invention.

What is claimed is:

1. A variable-color accessory, comprising:
   a plurality of accessory surfaces, wherein the accessory surfaces are flexible;
   a light-emitting plate, disposed inside at least one of the accessory surfaces, wherein the light-emitting plate is flexible, is bent consistent with the corresponding accessory surface, and has a plurality of light-emitting diodes for emitting different light colors;
   a light-scattering plate, disposed between the light-emitting plate and the corresponding accessory surface, wherein the light-scattering plate is flexible and light-transmitting; and
   a control unit, electrically connected to the light-emitting plate to control on/off and illumination intensity of the light-emitting diodes of the light-emitting plate.

2. The variable-color accessory of claim 1, wherein one surface of the light-scattering plate is bonded with the light-emitting plate and the other surface of the light-scattering plate is bonded with the corresponding accessory surface.

3. The variable-color accessory of claim 1, wherein the light-scattering plate is made of expanded polyethylene, polyethylene foam, expanded polypropylene, or an ethylene-vinyl acetate copolymer.

4. The variable-color accessory of claim 1, wherein the light-emitting plate is an edge lighting structure, the edge lighting structure has a light guide plate, and the light-emitting diodes are disposed on at least one edge of the light guide plate.

5. The variable-color accessory of claim 1, wherein the light-emitting plate includes a circuit board and the light-emitting diodes are disposed in a matrix on the circuit board.

6. The variable-color accessory of claim 1, wherein the control unit includes a wireless receiver for receiving a wireless signal.

7. The variable-color accessory of claim 6, wherein the wireless signal received by the control unit is from a mobile communication device, wherein the signal transmitted from the mobile communication device is manually selected by a user, or a photo of clothes worn by the user is taken with a camera function of the mobile communication device and then a color of the accessory is automatically selected by software in the mobile communication device and the corresponding wireless signal is transmitted to the control unit.

8. The variable-color accessory of claim 1, wherein the control unit includes a power supply unit, the power supply unit includes a battery, and the battery is electrically connected to the light-emitting diodes.

9. The variable-color accessory of claim 8, wherein the power supply unit includes two wires and two connectors, and the two connectors are disposed at ends of the two wires respectively, wherein when the connector of one of the wires is connected to an electronic device, the battery is capable of powering the electronic device, and when the connector of the other wire is connected to a power supply, the power supply is capable of charging the battery.

10. The variable-color accessory of claim 9, wherein the two connectors are Universal Serial Bus (USB) connectors.

11. The variable-color accessory of claim 8, wherein the power supply unit includes an induction coil for wirelessly powering an electronic device and wirelessly charging the battery.

12. The variable-color accessory of claim 1, wherein at least one of the accessory surfaces is made of an opaque material, and a plurality of light transmission holes are provided on the accessory surface.

13. The variable-color accessory of claim 1, wherein at least one of the accessory surfaces is made of a light-transmitting material.

14. The variable-color accessory of claim 1, wherein at least one of the accessory surfaces is made of a transparent material.

15. The variable-color accessory of claim 1, wherein the different light colors emitted from the light-emitting diodes are red, green, and blue respectively.

16. A variable-color device applied to an accessory, wherein the variable-color device is disposed inside at least one surface of the accessory surfaces of the accessory, the variable-color device comprising:
   a light-emitting plate, wherein the light-emitting plate is flexible and has a plurality of light-emitting diodes for emitting different light colors;
   a light-scattering plate, wherein the light-scattering plate is flexible and light-transmitting, and one surface of the light-scattering plate is bonded with the light-emitting plate and is capable of being bent consistent with the light-emitting plate; and
   a control unit, electrically connected to the light-emitting plate to control turn-on/off of the light-emitting diodes of the light-emitting plate.

17. The variable-color device of claim 16, wherein the accessory is a handbag.

18. The variable-color device of claim 16, wherein the light-emitting plate is an edge lighting structure, the edge lighting structure has a light guide plate, the light guide plate is flexible, and the light-emitting diodes are disposed on at least one edge of the light guide plate.

19. The variable-color device of claim 16, wherein the light-emitting plate includes a circuit board, the circuit board is flexible, and the light-emitting diodes are disposed in a matrix on the circuit board.

20. The variable-color device of claim 16, wherein the control unit includes a wireless receiver for receiving a wireless signal.

* * * * *